United States Patent
Chen

(10) Patent No.: US 12,467,802 B2
(45) Date of Patent: Nov. 11, 2025

(54) MEMBRANE OF A SENSOR WITH MULTIPLE DEFLECTABLE SECTIONS FOR DIFFERENT RANGES OF A SENSED FORCE OR PRESSURE

(71) Applicant: Measurement Specialties, Inc., Hampton, VA (US)

(72) Inventor: Ya-Mei Chen, Fremont, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 186 days.

(21) Appl. No.: 17/968,153

(22) Filed: Oct. 18, 2022

(65) Prior Publication Data

US 2024/0125658 A1    Apr. 18, 2024

(51) Int. Cl.
  *G01L 1/18*    (2006.01)
  *G01L 9/06*    (2006.01)

(52) U.S. Cl.
  CPC . *G01L 1/18* (2013.01); *G01L 9/06* (2013.01)

(58) Field of Classification Search
  CPC . G01L 19/0618; G01L 9/0055; G01L 9/0054; G01L 9/0042; G01L 9/0044; G01L 9/0048; G01L 1/2206; G01L 1/2293
  See application file for complete search history.

(56) References Cited

U.S. PATENT DOCUMENTS

| | | | | |
|---|---|---|---|---|
| 4,102,210 A * | 7/1978 | Couston | ............... | G01L 9/0044 338/42 |
| 5,070,735 A * | 12/1991 | Reichert | ............... | G01L 9/0042 338/4 |
| 5,333,504 A * | 8/1994 | Lutz | ............... | G01L 19/0618 73/726 |
| 5,381,299 A * | 1/1995 | Provenzano | ............... | H04R 19/00 361/283.4 |
| 5,821,595 A * | 10/1998 | Trimmer | ............... | G01L 9/0055 257/688 |
| 6,019,135 A * | 2/2000 | Onishi | ............... | F02M 55/04 220/721 |
| 6,395,574 B2 * | 5/2002 | Benzel | ............... | B81B 3/001 257/419 |
| 6,595,063 B1 * | 7/2003 | Rogne | ............... | G01L 9/0042 73/715 |
| 6,951,142 B2 * | 10/2005 | Ohsato | ............... | G01L 5/162 73/862.041 |
| 7,159,466 B2 * | 1/2007 | Hasegawa | ............... | G01P 15/0802 73/754 |
| 7,360,431 B2 * | 4/2008 | Yoneda | ............... | G01L 19/0645 73/715 |
| 7,503,221 B2 * | 3/2009 | Wade | ............... | G01L 9/0051 73/721 |
| 7,559,248 B2 * | 7/2009 | Kurtz | ............... | G01L 9/0051 73/756 |

(Continued)

FOREIGN PATENT DOCUMENTS

EP    3933365 A1 *    1/2022    ............... G01L 1/18

*Primary Examiner* — Tran M. Tran

(57) ABSTRACT

A body of a sensor includes a wafer having a cavity and a membrane deflectable into the cavity under an applied force. The membrane has a first section and a second section. The first section of the membrane is more deflectable than the second section in a first range of the applied force and the second section is more deflectable than the first section in a second range of the applied force that is different than the first range.

20 Claims, 7 Drawing Sheets

(56) References Cited

U.S. PATENT DOCUMENTS

| | | | | |
|---|---|---|---|---|
| 7,615,834 B2* | 11/2009 | Khuri-Yakub | H01L 28/40 | 257/419 |
| 7,661,317 B2* | 2/2010 | Kurtz | G01L 9/0055 | 73/714 |
| 7,802,481 B2* | 9/2010 | Henn | G01L 9/0055 | 250/231.19 |
| 7,856,885 B1* | 12/2010 | Bhansali | G01L 19/0092 | 73/715 |
| 8,511,171 B2* | 8/2013 | Gamage | B81C 1/00182 | 73/754 |
| 9,003,889 B2* | 4/2015 | Yoshida | G01L 9/0016 | 73/702 |
| 9,267,857 B2* | 2/2016 | Stewart | G01L 9/0054 | |
| 9,459,172 B2* | 10/2016 | Chen | G01L 9/0055 | |
| 9,464,950 B2* | 10/2016 | Zhang | G01L 1/14 | |
| 9,470,592 B2* | 10/2016 | Brida | G01L 9/0047 | |
| 9,702,777 B2* | 7/2017 | Miyashita | G01L 9/0058 | |
| 9,804,048 B2* | 10/2017 | Zhang | G01L 13/00 | |
| 9,963,340 B2* | 5/2018 | Brown | B81C 1/00158 | |
| 9,964,458 B2* | 5/2018 | Chiou | G01L 9/0054 | |
| 10,113,928 B2* | 10/2018 | Je | G01L 9/0045 | |
| 10,156,489 B2* | 12/2018 | Yin | G01L 9/0055 | |
| 10,197,462 B2* | 2/2019 | Brown | G01L 9/0047 | |
| 10,295,421 B2* | 5/2019 | Stewart | G01L 9/0045 | |
| 10,359,325 B2* | 7/2019 | Shapiro | G01L 1/2287 | |
| 10,481,026 B2* | 11/2019 | May | G01L 9/0055 | |
| 10,557,760 B2* | 2/2020 | Shapiro | G01B 7/002 | |
| 10,816,423 B2* | 10/2020 | Tokuda | G01L 9/0054 | |
| 10,871,407 B2* | 12/2020 | Chen | G01L 1/18 | |
| 10,871,413 B2* | 12/2020 | Zwijze | G01L 9/0051 | |
| 10,890,502 B2* | 1/2021 | Miyake | G01L 19/148 | |
| 11,060,937 B2* | 7/2021 | Lukacs | G01L 9/0073 | |
| 11,079,298 B2* | 8/2021 | Duqi | G01L 19/145 | |
| 11,181,431 B2* | 11/2021 | Tokuda | G01L 27/005 | |
| 11,359,984 B2* | 6/2022 | Kang | G01L 1/26 | |
| 11,473,991 B2* | 10/2022 | Alfaro | G01L 9/0052 | |
| 11,499,881 B2* | 11/2022 | Shang | G01L 9/0047 | |
| 11,573,143 B2* | 2/2023 | Chiou | B81B 3/0081 | |
| 2004/0079159 A1* | 4/2004 | Muchow | G01L 9/0055 | 73/716 |
| 2005/0016288 A1* | 1/2005 | Muchow | B81C 1/00158 | 73/754 |
| 2012/0297884 A1* | 11/2012 | Gamage | B81C 1/00182 | 29/25.35 |
| 2013/0118264 A1* | 5/2013 | Walter | G01L 27/007 | 73/717 |
| 2015/0040675 A1* | 2/2015 | Ding | G01L 19/06 | 216/13 |
| 2015/0276533 A1* | 10/2015 | Belov | G01L 9/0042 | 324/252 |
| 2023/0038134 A1* | 2/2023 | Schaller | G01L 19/147 | |

\* cited by examiner

MEMBRANE OF A SENSOR WITH MULTIPLE DEFLECTABLE SECTIONS FOR DIFFERENT RANGES OF A SENSED FORCE OR PRESSURE

FIELD OF THE INVENTION

The present invention relates to a sensor and, more particularly, to a membrane of a sensor that detects multiple ranges of a sensed force or pressure.

BACKGROUND

A sensor can be used to measure a force or pressure exerted on the sensor. Some sensors are used to sense multiple ranges of the force or pressure, for example a low range and a high range of the same applied force. To sense the multiple ranges, existing sensors include a body with multiple membranes; generally, one membrane is deflected in one of the sensed ranges, and another membrane or both membranes are deflected in another of the sensed ranges.

Forming a body of a sensor with multiple deflectable membranes to sense the multiple ranges of force or pressure, however, requires numerous productions steps. The formation of multiple membranes requires, for example, the etching of a number of separate recesses into the body, which leads to high production time and cost.

SUMMARY

A body of a sensor includes a wafer having a cavity and a membrane deflectable into the cavity under an applied force. The membrane has a first section and a second section. The first section of the membrane is more deflectable than the second section in a first range of the applied force and the second section is more deflectable than the first section in a second range of the applied force that is different than the first range.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
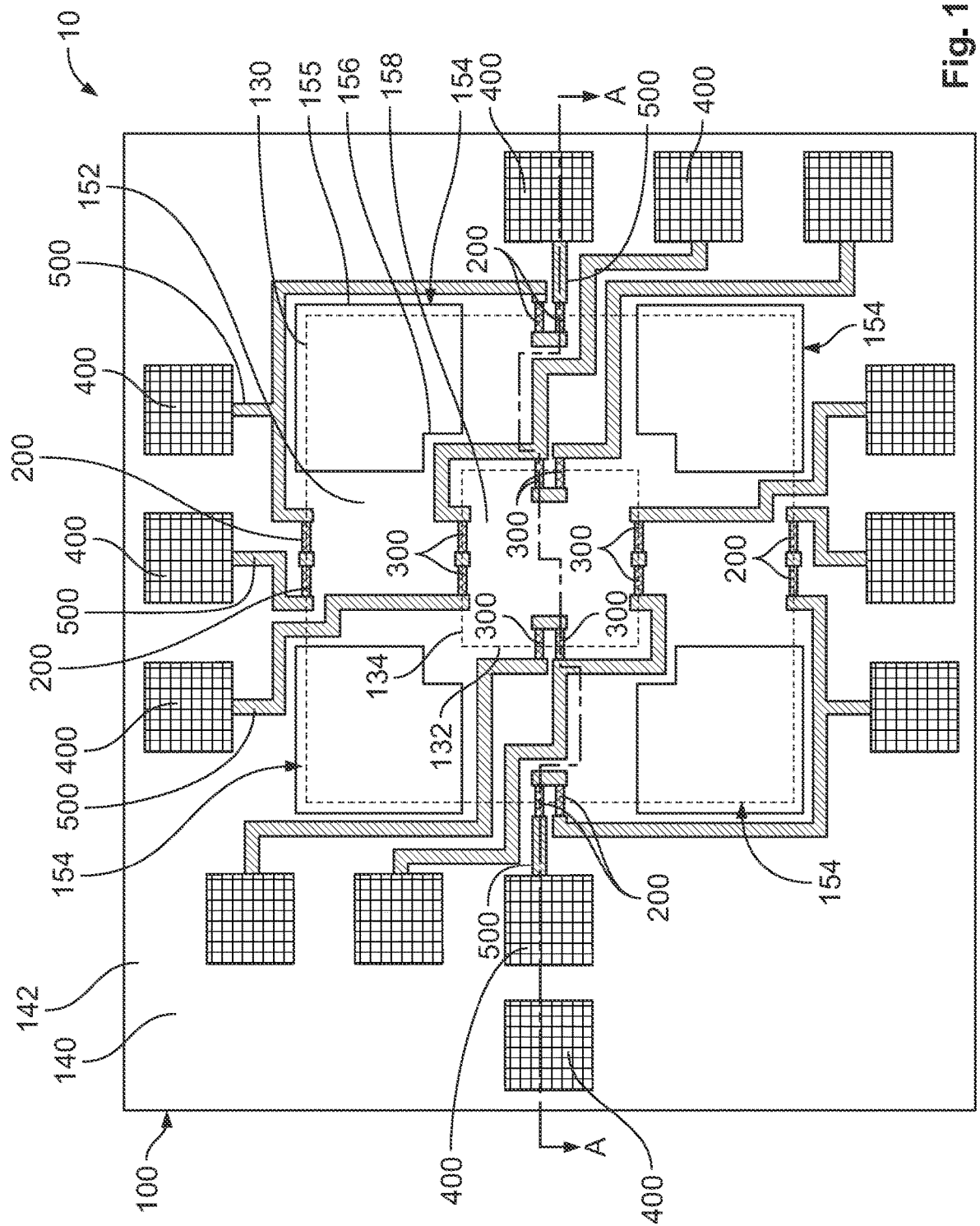
FIG. 1 is a plan view of a sensor according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "vertical." These descriptors are merely for clarity of the description and for differentiation of the various directions. These directional descriptors do not imply or require any particular orientation of the disclosed elements.

Figure 2:
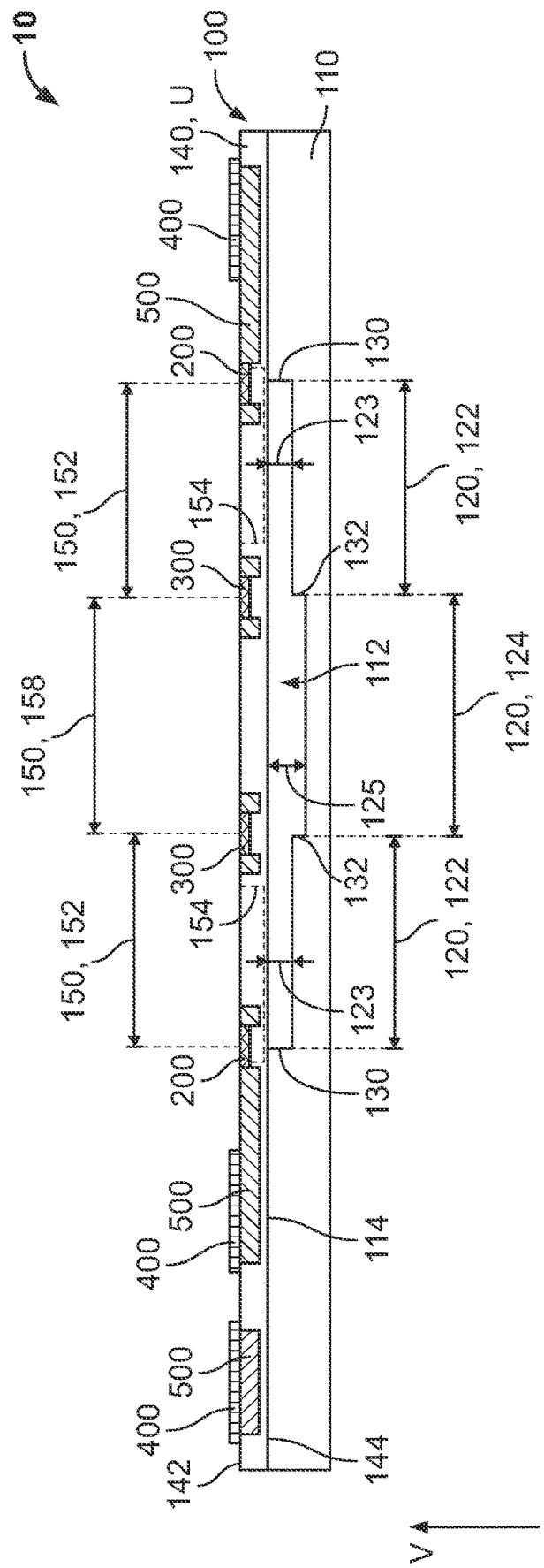
FIG. 2 is a sectional side view of the sensor, taken along line A-A of FIG. 1.

A sensor 10 according to an embodiment is shown in FIGS. 1 and 2. The sensor 10 includes a body 100, a plurality of piezoresistive elements 200, 300 disposed on the body 100, a plurality of contact pads 400 disposed on the body 100, and a plurality of connective paths 500 connecting the piezoresistive elements 200, 300 and the contact pads 400.

The body 100, as shown in FIG. 2, includes a wafer 110 and a membrane 140 disposed on the wafer 110. In the shown embodiment, the wafer 110 and the membrane 140 are each formed of a silicon material.

As shown in FIG. 2, the wafer 110 has a cavity 112 extending into a connection surface 114 of the wafer 110 in a vertical direction V. The wafer 110 has a plurality of portions 120 defining the cavity 112. In an embodiment, the cavity 112 is formed by an etching process, such as potassium hydroxide etching or deep reactive ion etching. In other embodiments, the cavity 112 may be formed by any process that can form the silicon of the wafer 110 to have the portions 120 of the cavity 112 described herein.

In the embodiment shown in FIG. 2, the portions 120 include a first portion 122 and a second portion 124. The first portion 122 has a first depth 123 from the connection surface 114 of the wafer 110 in the vertical direction V and the second portion 124 has a second depth 125 from the connection surface 114 of the wafer 110 in the vertical direction V. The second depth 125 is greater than the first depth 123.

The wafer 110 has a first step 130 from the connection surface 114 to the first portion 122 and a second step 132 from the first portion 122 to the second portion 124, as shown in FIG. 2. The second portion 124 is positioned within and surrounded by the first portion 122, as shown in the dotted lines of FIG. 1 indicating the position of the first step 130 and the second step 132 under the membrane 140.

The membrane 140 is a single piece of silicon having an upper surface 142 and a lower surface 144 opposite the upper surface 142 in the vertical direction V, as shown in FIG. 2. The membrane 140 is flexible in the vertical direction V, as will be described in greater detail below.

The membrane 140 is attached to the wafer 110 to form the body 100 of the sensor 10. The lower surface 144 of the membrane 140 is positioned on and attached to the connection surface 114 of the wafer 110 after the etching that forms the cavity 112 of the wafer 110. In an embodiment, the membrane 140 is pressed against the wafer 110 and heated to melt material of the membrane 140 at the lower surface 144 and the wafer 110 at the connection surface 114, bonding the membrane 140 and the wafer 110. In other embodiments, the membrane 140 can be attached to the wafer 110 by any other method that permits the deflection of the membrane 140 into the cavity 112 described in detail below.

The membrane 140 has a plurality of sections 150, as shown in FIG. 2. In the shown embodiment, the membrane 140 has a first section 152 and a second section 158. The first section 152 is positioned over the first portion 122 of the wafer 110 and the second section 158 is positioned over the second portion 124 of the wafer 110. As shown in FIG. 1, because the first and second sections 152, 158 of the membrane 140 are aligned respectively with the first and second portions 122, 124 of the wafer 110, the dotted lines indicating the first and second steps 130, 132 of the wafer 110 likewise indicate the boundaries of the first and second sections 152, 158 of the membrane 140; the second section 158 is surrounded by the first section 152 and is connected to the first section 152.

The membrane 140, as shown in FIGS. 1 and 2, has a plurality of recesses 154 extending into the upper surface 142 of the membrane 140 in the first section 152. The recesses 154 extend in the vertical direction V into the upper surface 142; the recesses 154 may extend partially into the upper surface 142 or through the membrane 140 from the upper surface 142 to the lower surface 144.

As shown in FIG. 1, the recesses 154 are distributed throughout the first section 152. In the shown embodiment, one of each of four recesses 154 is positioned at a corner of a square-shaped first section 152. In other embodiments, any other number of recesses 154 may be arranged differently in the first section 152, provided that the recesses 154 increase a deformability of the membrane 140 in the first section 152.

Each of the recesses 154, as shown in FIG. 1, has an outer edge shape 155 and an inner edge shape 156. The inner edge shape 156 is opposite the outer edge shape 155 and is adjacent to the second section 158. In the embodiment shown in FIG. 1, the outer edge shape 155 and the inner edge shape 156 are each rectilinear; the inner edge shape 156 is formed as a perpendicular corner in a section parallel to plane of the upper surface 142 of the membrane 140.

The second step 132 of the wafer 110 has a perimeter shape 134. In the embodiment shown in FIG. 1, the perimeter shape 134 of the second step 132 is polygonal; the perimeter shape 134 is formed as a square in a section parallel to a plane of the connection surface 114 of the wafer 110.

Figure 3:
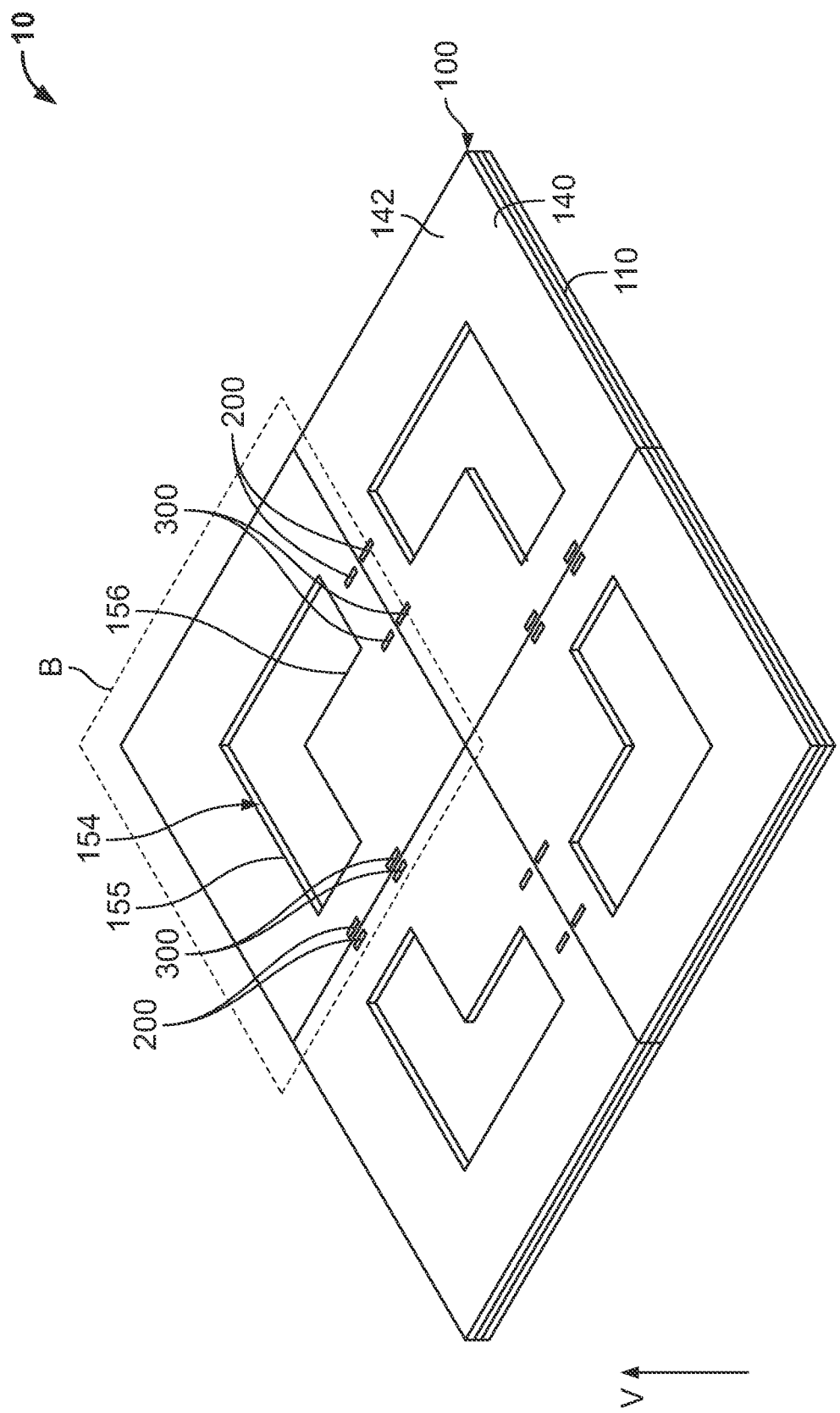
FIG. 3 is a perspective view of the sensor of FIG. 1.
Figure 4A:
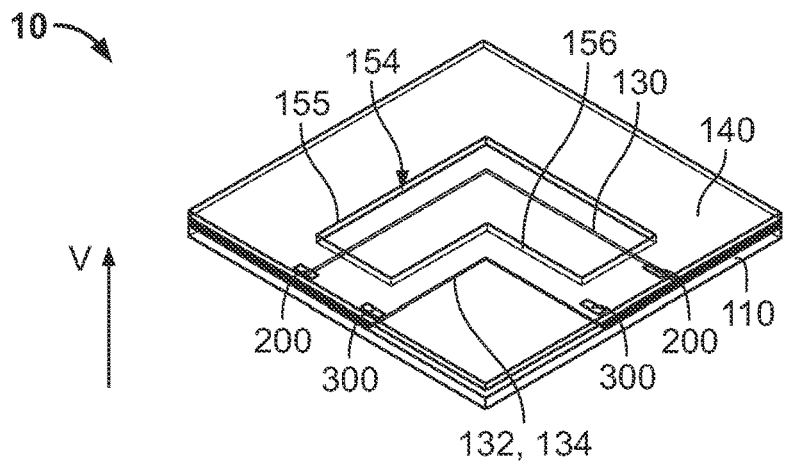
FIG. 4A is a partially transparent perspective view of a portion B of the sensor of FIG. 1.

The sensor 10 in the embodiment of FIGS. 1 and 2 is shown in a perspective view in FIG. 3. The recess 154 having the rectilinear outer edge shape 155 and inner edge shape 156 is shown in FIG. 3. FIG. 4A is a detail view of a portion B of FIG. 3 with some of the elements shown transparent in order to depict elements of the wafer 110 under the membrane 140. As shown in FIG. 4A, in an embodiment of the sensor 10, the perimeter shape 134 of the second step 132 of the wafer 110 is polygonal and the inner edge shape 156 of the recess 154 of the membrane 140 is rectilinear.

Figure 4B:
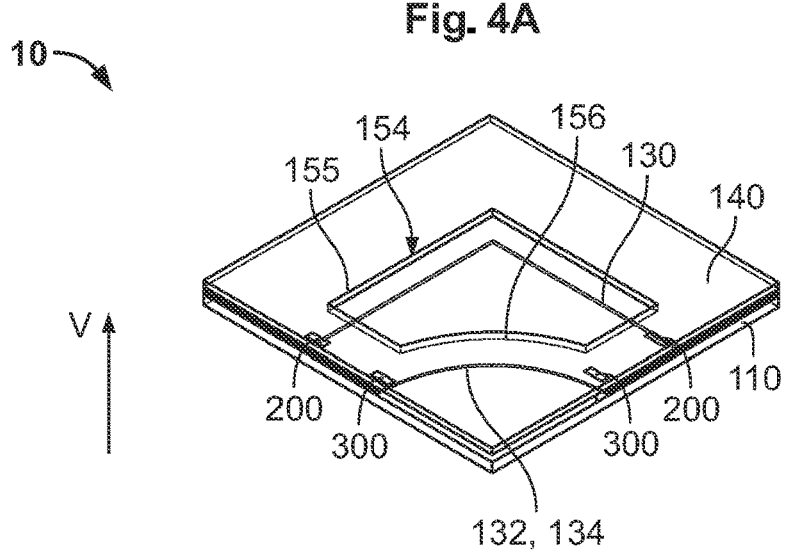
FIG. 4B is a partially transparent perspective view of the portion B according to another embodiment.
Figure 4C:
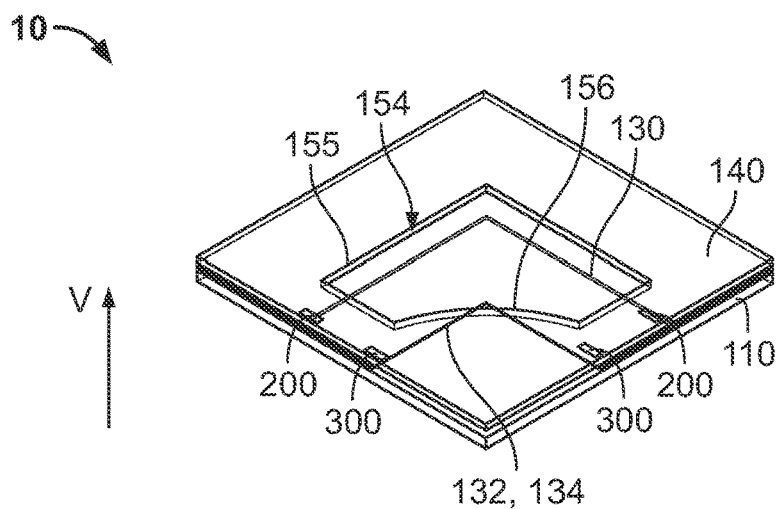
FIG. 4C is a partially transparent perspective view of the portion B according to a further embodiment.

The portion B of FIG. 3 is shown according to other embodiments of the sensor 10 in FIGS. 4B and 4C. As shown in the embodiment of FIG. 4B, the perimeter shape 134 of the second step 132 can alternatively be a circular shape and the inner edge shape 156 of the recess 154 can alternatively be a curved shape. In another embodiment shown in FIG. 4C, the inner edge shape 156 of the recess 154 is a curved shape and the perimeter shape 134 of the second step 132 is polygonal. In various embodiments, the inner edge shape 156 of the recess 154 can be curved or rectilinear and the perimeter shape 134 of the second step 132 can be polygonal or circular in any combination.

As shown in FIGS. 1 and 2, the piezoresistive elements 200, 300 include a plurality of first piezoresistive elements 200 are disposed on the first section 152 of the membrane 140. In the shown embodiment, the first piezoresistive elements 200 are formed by doping the silicon material of the membrane 140 with a first positive dopant. In other embodiments, the first piezoresistive elements 200 could be formed on the membrane 140 by any other piezoresistive structure. As shown in the embodiment of FIG. 1, the first piezoresistive elements 200 are distributed around the first section 152 of the membrane 140 to form a first Wheatstone bridge. In other embodiments, the first piezoresistive elements 200 could be arranged in any other manner in the first section 152 of the membrane 140.

As shown in FIGS. 1 and 2, the piezoresistive elements 200, 300 include a plurality of second piezoresistive elements 300 are disposed on the second section 158 of the membrane 140. In the shown embodiment, the second piezoresistive elements 300 are formed by doping the silicon material of the membrane 140 with the same first positive dopant as the first piezoresistive elements 200. In other embodiments, the second piezoresistive elements 300 could be formed on the membrane 140 by any other piezoresistive structure. As shown in the embodiment of FIG. 1, the second piezoresistive elements 300 are distributed around the second section 158 of the membrane 140 to form a second Wheatstone bridge. In other embodiments, the second piezoresistive elements 300 could be arranged in any other manner in the second section 158 of the membrane 140.

The contact pads 400, as shown in FIGS. 1 and 2, are disposed on the upper surface 142 of the membrane 140 outside of the first section 152 and the second section 158. In embodiment, the contact pads 400 are each formed of a metal material deposited on the upper surface 142. In other embodiments, the contact pads 400 can be any structure that permits an external electrical connection with the components of the sensor 10.

The connective paths 500 are disposed on the membrane 140 and, as shown in FIGS. 1 and 2, connect the piezoresistive elements 200, 300 with the contact pads 400. In the shown embodiment, the connective paths 500 are formed by doping the silicon material of the membrane 140 with a second positive dopant that is more highly doped than the first positive dopant of the piezoresistive elements 200, 300. In other embodiments, the connective paths 500 could be any structure that forms an electrical connection between the piezoresistive elements 200, 300 and the contact pads 400.

The use of the sensor 10 to measure a force or pressure applied on the membrane 140 will now be described in greater detail primarily with respect to FIGS. 2 and 5A-5C. The sensor 10 of the embodiment shown in FIGS. 1-4A will be used in the description below, but the description applies equally to the other perimeter shapes 134 of the second step 132 and the other inner edge shapes 156 of the recesses 154 mentioned in the embodiments above.

In an undeformed state U of the membrane 140 shown in FIG. 2, the membrane 140 extends over the cavity 112. In the undeformed state U, no force is applied on the upper surface 142 of the membrane 140, or a force applied is below a threshold required to initially deform or deflect the membrane 140. The first portion 122 has the first depth 123 from the first section 152 and the second portion 124 has the second depth 125 from the second section 158 in the undeformed state U.

The deflection of the membrane 140 shown in FIGS. 5A-5C will be described with respect to an applied force on the membrane 140 that is either within a low force range FL, within a high force range FH greater than the low force range FL, or is a critical force FC between the low force range FL and the high force range FH.

Figure 5A:
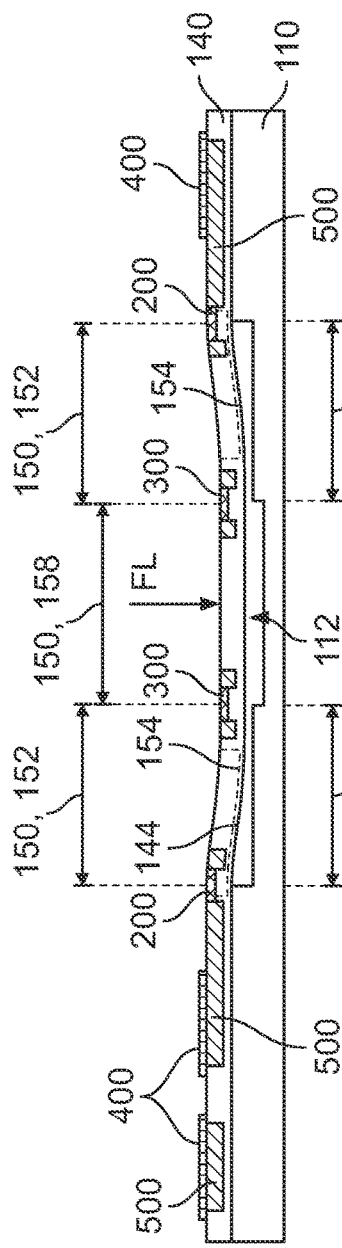
FIG. 5A is a sectional side view of the sensor of FIG. 2 under an applied force in a low force range.

An exemplary force in the low force range FL applied on the membrane 140 is shown in FIG. 5A. The low force range FL is sufficiently high to deflect the membrane 140 in the vertical direction V into the cavity 112 of the wafer 110, but is less than the critical force FC described in greater detail below. In the low force range FL, the first section 152 of the membrane 140 is more deflectable than the second section 158 of the membrane 140 due to the presence of the recesses 154 that decrease a stiffness of the first section 152. Because the first section 152 deflects more than the second section 158 in the low force range FL, the first piezoresistive elements 200 in the first section 152 undergo more strain and are more sensitive to the applied force in the low force range FL than the second piezoresistive elements 300 in the second section 158. A measurement of the applied force in the low force range FL can be determined from the resistance of the first piezoresistive elements 200 read through an external element connected to the first piezoresistive elements 200 through the contact pads 400 and the connective paths 500. In the low force range FL, the lower surface 144 of the membrane 140 remains spaced apart from the first portion 122 and the second portion 124 of the wafer 110 in the vertical direction V.

Figure 5B:
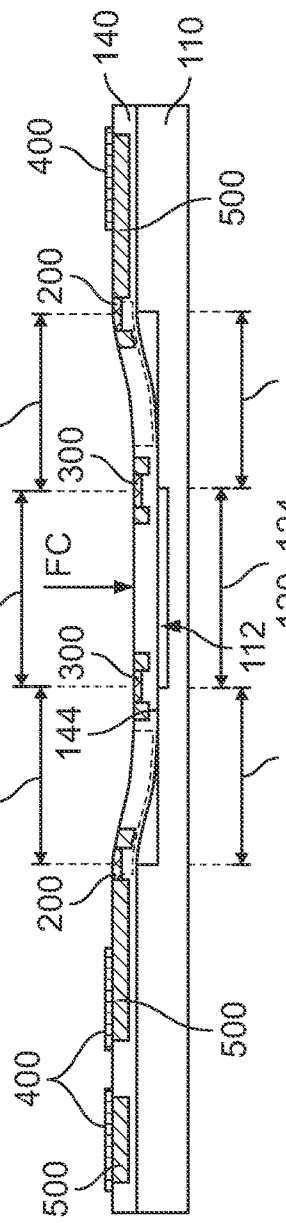
FIG. 5B is a sectional side view of the sensor of FIG. 2 under a critical force.

When the applied force on the membrane 140 reaches the critical force FC greater than the low force range FL, the lower surface 144 of the membrane 140 in the first section 152 abuts the first portion 122 of the wafer 110, as shown in FIG. 5B. The critical force FC is the applied force at which the first section 152 of the membrane 140 first abuts the first portion 122 of the wafer 110. At the critical force FC, the second section 158 of the membrane 140 is still spaced apart from the second portion 124 of the wafer 110 in the vertical direction V.

Figure 5C:
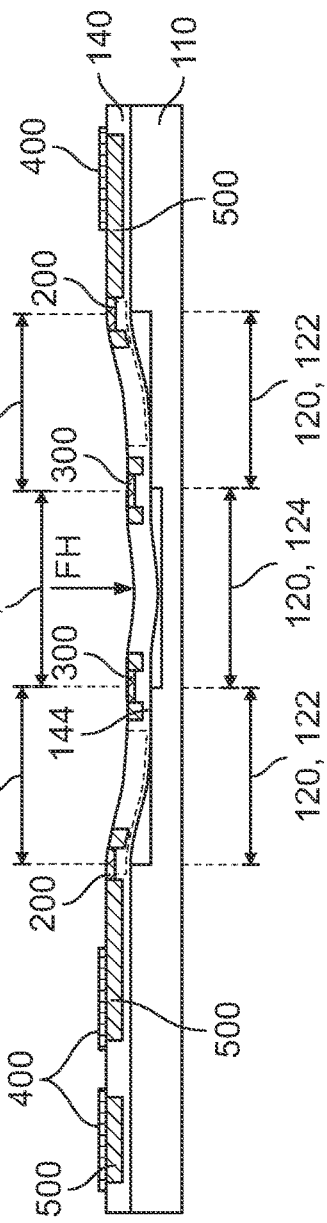
FIG. 5C is a sectional side view of the sensor of FIG. 2 under the applied force in a high force range.

When the applied force increases beyond the critical force FC into the high force range FH shown in FIG. 5C, the first section 152 of the membrane 140 remains in contact with the first portion 122 of the wafer 110, limiting or preventing continued deflection of the first section 152. In the high force range FH, the second section 158 of the membrane 140 spaced apart from the second portion 124 of the wafer 110 is deflectable toward the second portion 124 in the vertical direction V; the second section 158 is more deflectable than the first section 152 in the high force range FH. Because the second section 158 deflects more than the first section 152 in the high force range FH, the second piezoresistive elements 300 in the second section 158 undergo more strain and are more sensitive to the applied force in the high force range FH than the first piezoresistive elements 200 in the first section 152. A measurement of the applied force in the high force range FH can be determined from the resistance of the second piezoresistive elements 300 read through an external element connected to the second piezoresistive elements 300 through the contact pads 400 and the connective paths 500. The sensor 10 can be used to continue to read the applied force in the high force range FH until the second section 158 of the membrane 140 contacts the second portion 124 of the wafer 110.

The sensor 10 described above with respect to the embodiments of FIGS. 1-5C has a wafer 110 with two portions 120 and a membrane 140 with two sections 150 that is used to detect two ranges FL, FH of an applied force. The principles of the invention, however, are not limited to sensing two ranges of the applied force; in other embodiments, as shown in FIGS. 6A-7B, the sensor 10 can be used to detect more than two ranges.

In the sensors 10 shown in the embodiments of FIGS. 6A-7B, like reference numbers refer to like elements and primarily the differences from the embodiments shown in FIGS. 1-5C will be described in detail. The contact pads 400 and connective paths 500 are omitted in FIGS. 6A-7B for simplicity of the drawings but would be formed and would function identically to those in the embodiments of FIGS. 1-5C.

Figure 6A:
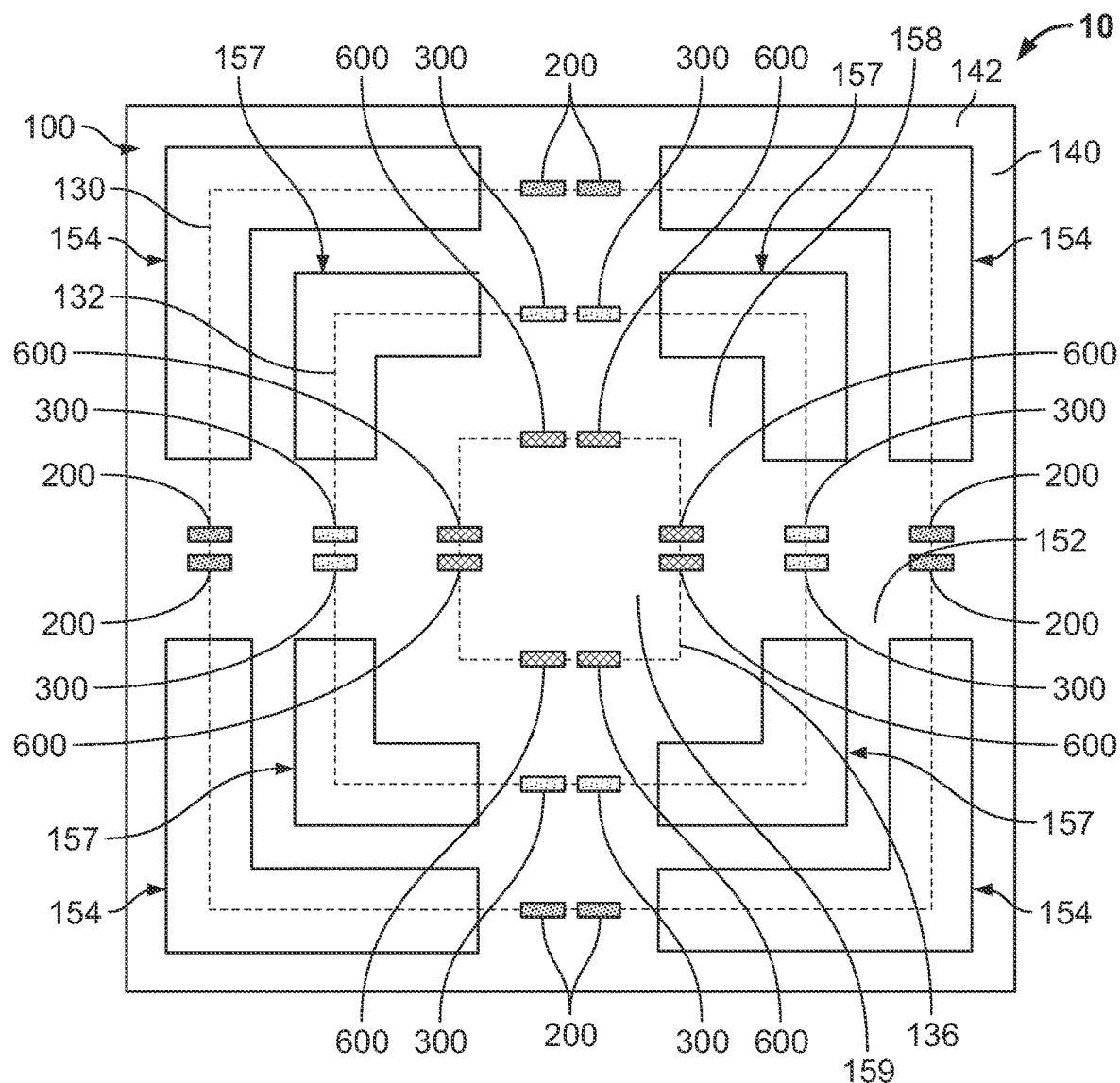
FIG. 6A is a plan view of a sensor according to another embodiment.
Figure 6B:
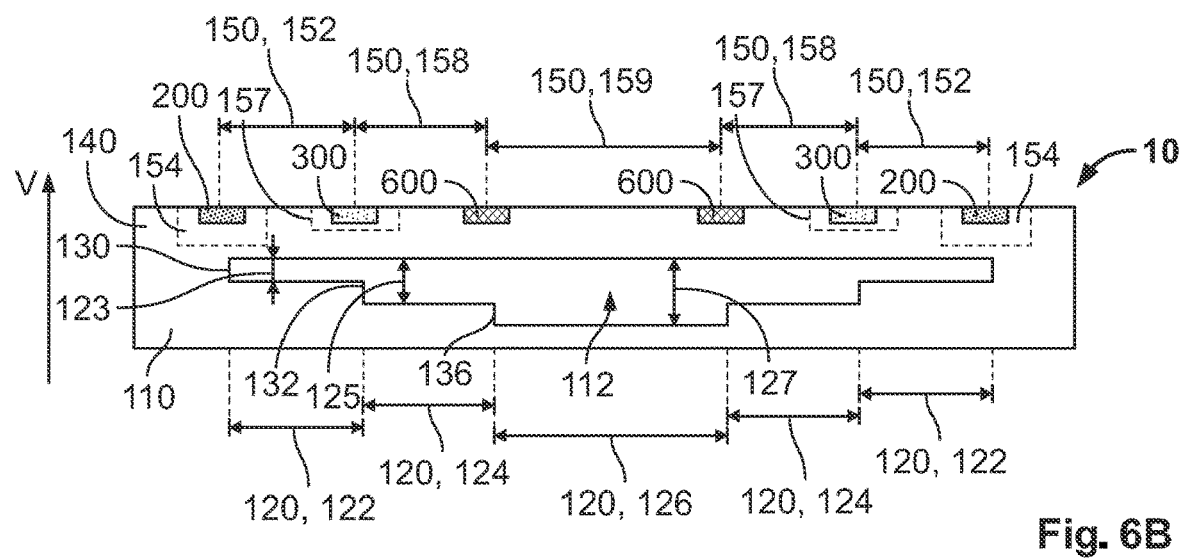
FIG. 6B is a sectional side view of the sensor of FIG. 6A.
Figure 7A:
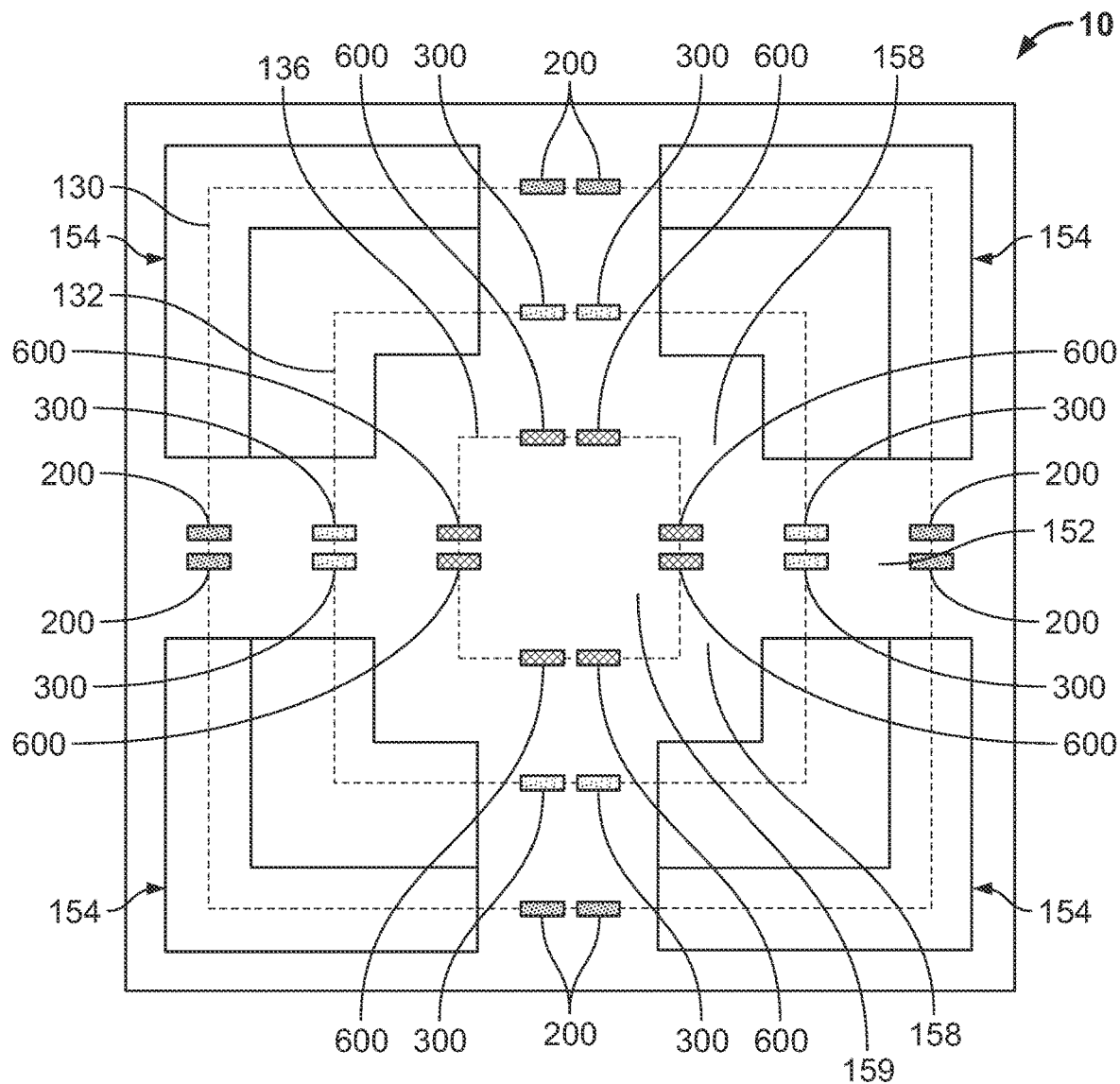
FIG. 7A is a plan view of a sensor according to a further embodiment.
Figure 7B:
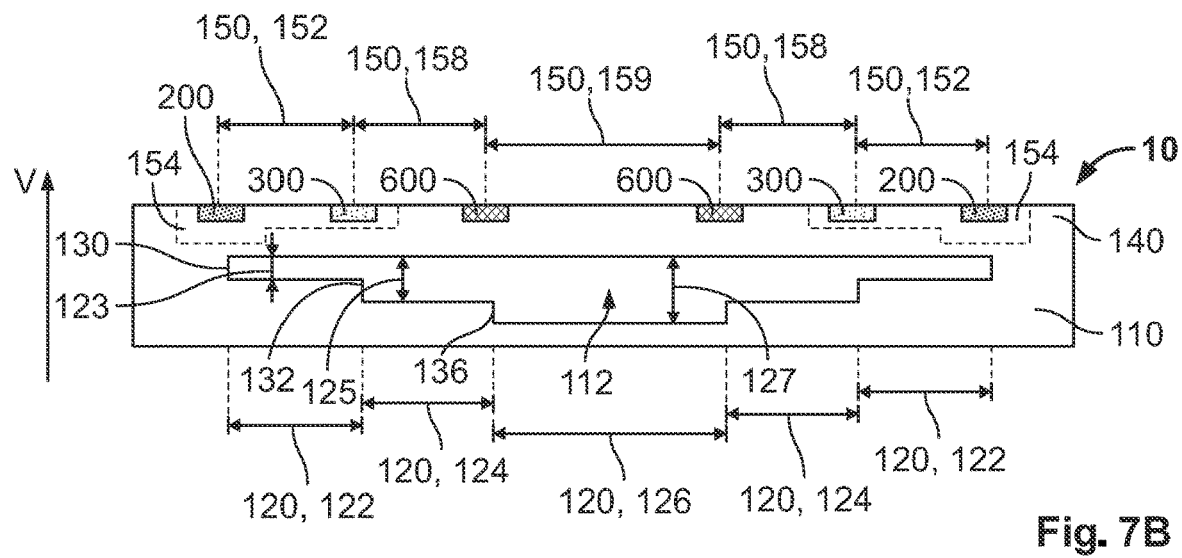
FIG. 7B is a sectional side view of the sensor of FIG. 7A.

In the embodiments shown in FIGS. 6-7B, the portions 120 of the wafer 110 include a third portion 126 disposed within the second portion 124. The third portion 126 of the wafer 110 is positioned within and surrounded by the second portion 124. A boundary between the second portion 124 and the third portion 126 is defined by a third step 136. The third portion 125 has a third depth 127 in the vertical direction V that is greater than the second depth 125 and the first depth 123.

In the embodiments shown in FIGS. 6-7B, the sections 150 of the membrane 140 include a third section 159 disposed within and surrounded by the second section 158. The third section 159 of the membrane 140 is aligned with the third portion 126 of the wafer 110. The sensor 10 includes a plurality of third piezoresistive elements 600 disposed on the third section 159 of the membrane 140.

The first section 152 of the membrane 140 has the first recesses 154 as described above. In the embodiment of FIGS. 6A and 6B, the second section 158 has a plurality of second recesses 157 extending in the vertical direction V into the upper surface 142 of the membrane 140. The second recesses 157, as shown in FIG. 6B, extend a smaller distance in the vertical direction V into the upper surface 142 and are separate from the first recesses 154. The arrangement in this embodiment allows the second section 158 of the membrane 140 to be less deflectable than the first section 152, but more deflectable then the third section 159.

In another embodiment shown in FIGS. 7A and 7B, the recesses 154 of the first section 152 extend continuously into the second section 158. In this embodiment, as shown in FIG. 7B, a portion of the recesses 154 in the second section 158 has a smaller depth extending into the upper surface 142 in the vertical direction V than a portion of the recesses 154 in the first section 152. The arrangement in this embodiment incorporates a joined recess 154 that spans the first and second sections 152, 158 while allowing the second section 158 to be less deflectable than the first section 152, but more deflectable than the third section 159.

The sensor 10 in the embodiments of FIGS. 6A-7B has sensitivity in three ranges of an applied force. Similarly to the embodiment described with respect to FIGS. 1-5C, in a first range, when the membrane 140 is spaced apart from the portions 120 of the wafer 110 in the vertical direction V, the first section 152 is most deflected and the first piezoresistive elements 200 are more sensitive to the applied force than the second and third piezoresistive elements 300, 600; in a second range over a critical force at which the first section 152 contacts the first portion 122, the second section 158 of the membrane 140 is most deflected and the second piezoresistive elements 300 are more sensitive to the applied force than the first and third piezoresistive elements 200, 600; and in a third range over another critical force at which the second section 158 contacts the second portion 124, the third section 159 of the membrane 140 is most deflected and the third piezoresistive elements 600 are more sensitive to the applied force than the first and second piezoresistive elements 200, 300.

As illustrated in the embodiments described above, the principles of the invention can be applied to form the sensor 10 sensing any number of ranges, with the number of ranges corresponding to the number of portions 120 of the wafer 110 and the number of sections 150 of the membrane 140, with a plurality of piezoresistive elements disposed on each of the sections 150 of the membrane 140. In all embodiments, each of the sections 150 of the membrane 140 is more deflectable than the other sections of the membrane 140, resulting in a greater strain on one corresponding set of piezoresistive elements, in one of the plurality of ranges of the applied force.

In the sensor 10 according to the embodiments of the present invention, the body 100 has a single membrane 140 that is capable of sensing the applied force in multiple ranges by having different sections 150 of the membrane 140 that are more deflectable than others in different ranges, leading to a difference in sensitivity of the piezoresistive elements 200, 300, 600 in the different ranges. Using the single membrane 140 to detect the multiple ranges, which only requires etching the single cavity 112 of the wafer 110, reduces the number of production steps and decreases the production cost of the sensor 10 while maintaining the sensitivity across multiple ranges of force or pressure.

What is claimed is:

1. A body of a sensor, comprising:
    a wafer having a cavity; and
    a membrane deflectable into the cavity under an applied force, the membrane is formed in a single piece of a silicon material and has a lower surface facing the cavity, the membrane has a first section and a second section positioned through the membrane, the first section of the membrane is more deflectable than the second section in a first range of the applied force and the second section is more deflectable than the first section in a second range of the applied force that is different than the first range, the lower surface of the membrane directly abuts a surface within the cavity integrated with a wall of the wafer in the second range of the applied force.

2. The body of claim 1, wherein the second section is surrounded by the first section and is connected to the first section.

3. The body of claim 2, wherein the second range is greater than the first range.

4. The body of claim 1, wherein the membrane has a plurality of recesses extending into an upper surface of the membrane in the first section.

5. The body of claim 4, wherein each of the recesses has an inner edge shape adjacent to the second section, the inner edge shape is curved or rectilinear.

6. The body of claim 4, wherein each of the recesses extends into the membrane from the upper surface.

7. The body of claim 1, wherein the wafer has a plurality of portions defining the cavity, the plurality of portions include a first portion having a first depth from the membrane in an undeformed state of the membrane and a second portion having a second depth from the membrane in the undeformed state, the second depth is greater than the first depth.

8. The body of claim 7, wherein the wafer has a step between the first portion and the second portion.

9. The body of claim 8, wherein the step has a perimeter shape that is circular or polygonal.

10. The body of claim 7, wherein the second portion is positioned within and surrounded by the first portion.

11. The body of claim 7, wherein the first section of the membrane abuts the first portion of the wafer when the applied force is equal to or greater than a critical force.

12. The body of claim 11, wherein the critical force is between the first range and the second range.

13. The body of claim 12, wherein the second portion of the membrane is deflectable toward the second portion of the wafer in the second range of the applied force.

14. The body of claim 1, wherein the first section and the second section are two of at least three sections of the membrane, each of the at least three sections of the membrane is more deflectable than the other of the sections in a corresponding one of a plurality of ranges of the applied force.

15. A sensor, comprising:
    a body including a wafer and a membrane deflectable into a cavity of the wafer under an applied force, the membrane is formed in a single piece of a silicon material and has a lower surface facing the cavity;
    a plurality of first piezoresistive elements disposed on a first section of the membrane; and
    a plurality of second piezoresistive elements disposed on a second section of the membrane, the first section and the second section positioned through the membrane, the first section of the membrane is more deflectable than the second section in a first range of the applied force and the second section is more deflectable than the first section in a second range of the applied force that is different than the first range, the lower surface of the membrane directly abuts a surface within the cavity integrated with a wall of the wafer in the second range of the applied force.

16. The sensor of claim 15, wherein the first piezoresistive elements are more sensitive to the applied force than the second piezoresistive elements in the first range and the second piezoresistive elements are more sensitive to the applied force than the first piezoresistive elements in the second range, the second range is greater than the first range.

17. The sensor of claim 15, wherein the first piezoresistive elements form a first Wheatstone bridge and the second piezoresistive elements form a second Wheatstone bridge.

18. The sensor of claim 15, further comprising a plurality of contact pads disposed on the membrane outside of the first section and the second section and a plurality of connective paths connecting the contact pads to the first piezoresistive elements and the second piezoresistive elements, the plurality of connective paths extend through the first section and the second section.

19. The sensor of claim 18, wherein the contact pads are a metal material disposed on an upper surface of the membrane.

20. The sensor of claim 18, wherein the body is a silicon material, the first piezoresistive elements, the second piezoresistive elements, and the connective paths are each a doped portion of the silicon material.

* * * * *